(12) United States Patent
Ito et al.

(10) Patent No.: US 9,589,181 B2
(45) Date of Patent: Mar. 7, 2017

(54) PERSON SEARCH METHOD AND DEVICE FOR SEARCHING PERSON STAYING ON PLATFORM

(71) Applicant: Hitachi Kokusai Electric Inc., Tokyo (JP)

(72) Inventors: Wataru Ito, Tokyo (JP); Yohei Akimoto, Tokyo (JP)

(73) Assignee: HITACHI KOKUSAI ELECTRIC INC. (JP)

( * ) Notice: Subject to any disclaimer, the term of this patent is extended or adjusted under 35 U.S.C. 154(b) by 0 days.

(21) Appl. No.: 14/771,004

(22) PCT Filed: Feb. 18, 2014

(86) PCT No.: PCT/JP2014/053766
§ 371 (c)(1),
(2) Date: Aug. 27, 2015

(87) PCT Pub. No.: WO2014/132841
PCT Pub. Date: Sep. 4, 2014

(65) Prior Publication Data
US 2016/0012280 A1    Jan. 14, 2016

(30) Foreign Application Priority Data
Feb. 28, 2013 (JP) .................... 2013-039087

(51) Int. Cl.
*G06K 9/60* (2006.01)
*G06K 9/00* (2006.01)
(Continued)

(52) U.S. Cl.
CPC ... *G06K 9/00288* (2013.01); *G06F 17/30247* (2013.01); *G06K 9/00268* (2013.01); *G06K 9/00771* (2013.01); *G08B 13/19613* (2013.01)

(58) Field of Classification Search
CPC .......... G06F 17/30247; G06K 9/00268; G06K 9/00288; G06K 9/00771; G08B 13/19613
(Continued)

(56) References Cited

U.S. PATENT DOCUMENTS 7,257,239 B2 * 8/2007 Rowe ................. G06K 9/00221
382/103
8,068,645 B2 * 11/2011 Kameyama ............. G06T 11/60
382/118

(Continued)

FOREIGN PATENT DOCUMENTS

JP  2006-11728 A   1/2006
JP  2009-27393 A   2/2009
(Continued)

OTHER PUBLICATIONS

International Search Report.

Primary Examiner — Mekonen Bekele
(74) Attorney, Agent, or Firm — Bacon & Thomas, PLLC

(57) ABSTRACT

Provided is a suspicious person detection method. First, a normal similar facial image search is carried out. Next, facial images, which are detected automatically from the input images and specified manually, are specified to be determined. Next, similar faces are searched for limited time on a time axis on the database. Next, the number of search results that distance between the features is lower than predetermined value is calculated and it is determined that the number of appearances is large and a possibility of a prowling person is high if the number of cases is large, and otherwise a possibility of prowling person is low. Last, a similarity between a facial image of a pre-registered residents and a facial image of a person whose number is large is calculated, and it is re-determined that the person is residents if the similarity is high, regardless of the determination.

6 Claims, 5 Drawing Sheets

(51) Int. Cl.
*G08B 13/196* (2006.01)
*G06F 17/30* (2006.01)

(58) Field of Classification Search
USPC .................... 382/196, 305, 195, 115, 103
See application file for complete search history.

(56) References Cited

U.S. PATENT DOCUMENTS

| | | | | |
|---|---|---|---|---|
| 8,532,439 | B2* | 9/2013 | Kosugiyama | H04N 1/00442 |
| | | | | 348/130 |
| 2004/0081338 | A1* | 4/2004 | Takenaka | G08B 13/1961 |
| | | | | 382/118 |
| 2004/0117638 | A1* | 6/2004 | Monroe | G06K 9/00221 |
| | | | | 713/186 |
| 2006/0133653 | A1* | 6/2006 | Sznba | A61B 5/11 |
| | | | | 382/115 |
| 2006/0257041 | A1* | 11/2006 | Kameyama | G06T 11/60 |
| | | | | 382/254 |
| 2011/0235900 | A1 | 9/2011 | Porikli et al. | |
| 2013/0266193 | A1* | 10/2013 | Tiwari | G06K 9/00771 |
| | | | | 382/115 |

FOREIGN PATENT DOCUMENTS

| | | | | |
|---|---|---|---|---|
| JP | 2010-205191 A | 9/2010 | | |
| JP | 2011-66867 A | 3/2011 | | |
| JP | 4700477 B2 | 3/2011 | | |
| JP | 2011-186733 A | 9/2011 | | |
| JP | WO 2011111129 A1 * | 9/2011 | ....... | G06F 17/30247 |
| JP | 2011-210252 A | 10/2011 | | |
| JP | 2012-68717 A | 4/2012 | | |

\* cited by examiner

PERSON SEARCH METHOD AND DEVICE FOR SEARCHING PERSON STAYING ON PLATFORM

FIELD OF THE INVENTION

The present invention relates to a person search method, and more particularly to a person search method for automatically extracting a person having a behavioral feature among persons appearing in a moving image.

BACKGROUND OF THE INVENTION

Conventionally, there has been known a person search system for searching for, on a computer, a desired person in images (moving images) that have been captured or recorded by a monitoring camera or the like by means of an image recognition technique or the like (see, e.g., Patent Documents 1 to 4). Search technology based on the characteristics of the image itself without depending on external information such as tagging is generally called Content-Based Image Retrieval (CBIR), and it also has begun to be used in the search of a person.

Patent Document 1 discloses an image search system and a person search method of cutting out a portion where a person (face) appears from an image, extracting a color histogram or the like as a feature for specifying a person individually, and if the feature is similar to that of a desired person, estimating that the person is the same person as the desired person.

When whether or not the person is the desired person can be determined with a certain degree of accuracy, as in Patent Document 2, by linking images of the same person captured at different times by different cameras, it is possible to track the movement of a person in a much larger area than in the case of one camera, and various applications have been proposed, accordingly. For example, Patent Document 3 discloses an image security system of specifying a movement path of the person by searching captured images, and using the movement path for security management. Also, Patent Document 4 discloses a safety management apparatus for determining whether or not a behavior of a person in a station platform is unusual.

Patent Document 1: Japanese Patent Laid-open Publication No. 2009-027393
Patent Document 2: Japanese Patent No. 4700477
Patent Document 3: Japanese Patent Laid-open Publication No. 2012-068717
Patent Document 4: Japanese Patent Laid-open Publication No. 2010-205191
Patent Document 5: Japanese Patent Laid-open Publication No. 2011-66867
Patent Document 6: Japanese Patent Laid-open Publication No. 2011-210252

As described above, it became possible to understand the behavior of the person by the application of similar image retrieval technique, but the amount of information becomes enormous depending on the number of cameras, images and an accumulation period of features. As in so-called big data, very small part of the information is useful in a monitoring camera system. Sufficient studies have not been conducted on what useful information is extracted based on and how to extract useful information.

Also in an example of detecting a suspicious person by using a security camera, it is difficult to uniquely translate an abstract concept such as "suspicious" by using low-dimensional processing that can be performed by a machine. Even in the case of using a learning machine such as a support vector machine of Patent Document 6 (JP2011-210252A), if re-availability of the learning results cannot be expected, it is not worth an effort to prepare learning data (conditions for detecting a suspicious person).

SUMMARY OF THE INVENTION

In view of the above, the present invention provides a person search device capable of extracting information that is considered more universally useful, or detecting a particularly meaningful event in a certain application.

A person search method comprises first step of creating a database by detecting facial images in input images, extracting features from the facial images, and registering the features in the database together with time information; second step of specifying facial images which are detected automatically or specified manually from the input images as facial images to be determined; third step of searching the database created in the first step for similar faces for limited time on a time axis; fourth step of calculating the number of search results that distance between the features is lower than predetermined value (similarity is high) and determining that the number of appearances is large and a possibility of a prowling person is high if the number of cases is large, and that the number of appearances is small and a possibility of prowling person is low if the number of cases is small; and calculating similarity between a facial image of a pre-registered residents and a facial image of a person whose number is large, and re-determining that the person is resident if the similarity is high, regardless of determination of the fourth step.

According to the present invention, it is possible to extract the information that is considered more universally useful, and detect a particularly meaningful event in a certain application.

DETAILED DESCRIPTION OF THE EMBODIMENTS

Figure 1:
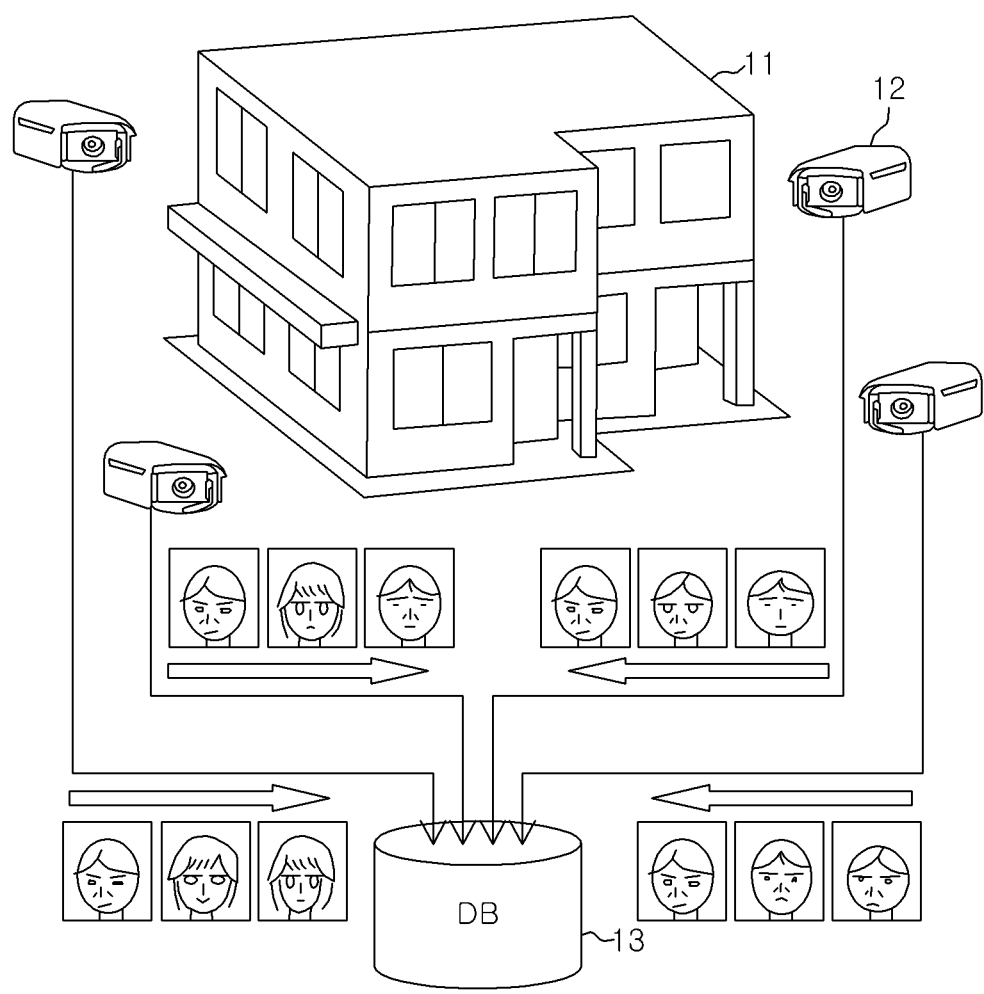
FIG. 1 shows a configuration of a prowling person detection system 1 (first and second embodiments).

Hereinafter, embodiments of the present invention will be described in detail with reference to the accompanying drawings. Throughout the drawings, like reference numerals will be used to designate like elements having substantially the same functions, and redundant description thereof will be omitted.

First Embodiment

First, an embodiment of applying the present invention to detection of a prowling person will be described in brief with reference to FIGS. 1 to 4. FIG. 1 illustrates a configuration of a prowling person detection system 1 of a first embodiment in accordance with the present invention.

The prowling person detection system of the present embodiment is intended to monitor the perimeter of a space, which is used mainly by specific people, such as collective housing, a company's office, and school. As shown in FIG. 1, there is a facility (building) 11, and monitoring cameras 12 for capturing an area around the facility are installed. The range which can be captured by the monitoring cameras 12 is referred to as a monitored range. Each of the monitoring cameras 12 has a face detection function and, when a face is included in a captured image, transmits a partial image (facial image) obtained by cutting and taking a part corresponding to the face and a feature vector calculated from the facial image. A database (DB) 13 registers the feature vector received from each of the monitoring cameras 12 in association with the time or the like.

Figure 2A:
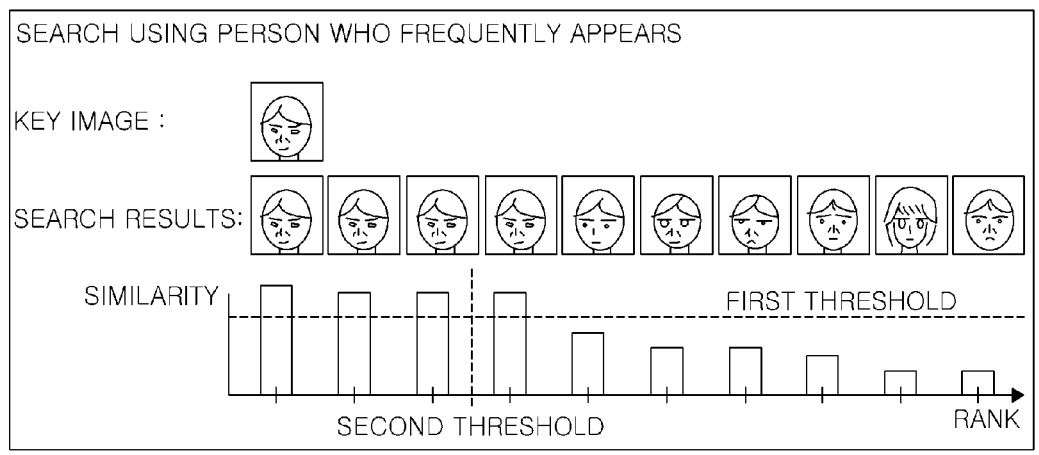
FIGS. 2A and 2B conceptually show the principle of determining a prowling person (first embodiment).
Figure 2B:
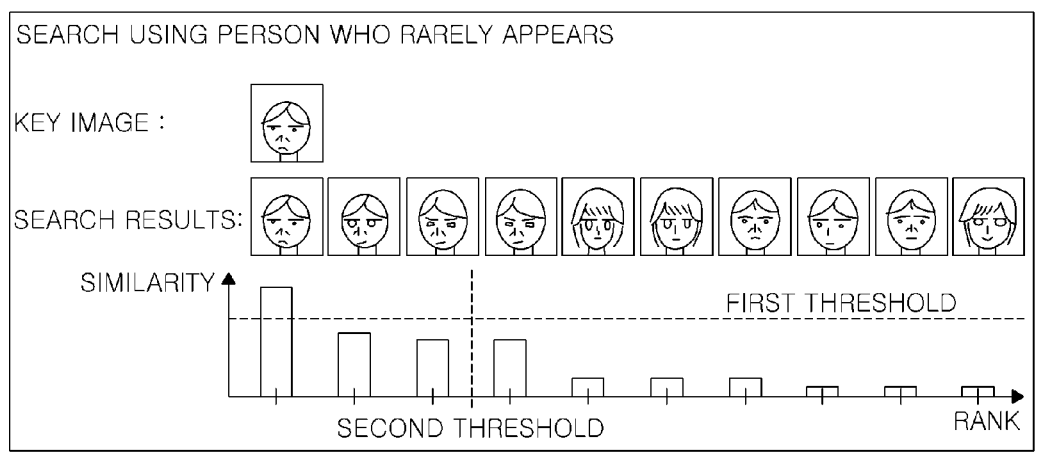

FIGS. 2A and 2B conceptually show the principle of determining a prowling person in the first embodiment. For example, there is assumed a case where a retrieval is performed on the DB 13, in which numerous feature vectors are registered, by using as a key image a facial image of a person detected immediately by the monitoring camera 12. An image shown on the upper side of each of FIGS. 2A and 2B is the key image. FIG. 2A shows a case where a person of the key image frequently appears, and FIG. 2B shows a case where a person of the key image rarely appears.

The retrieval to be performed on the DB 13 is a process of taking out, preferably all of, feature vectors similar to those of the key image, from the feature vectors registered therein. In each of FIGS. 2A and 2B, ten most similar cases are displayed as search results. If the similarity between each face in the search results and the key image is low, a person of each face is more likely to be different from the person of the key image. Accordingly, a predetermined first threshold may be provided for the similarity, a face having the similarity exceeding the first threshold may be estimated to be the same person, and the number of such cases may be counted. Then, if the number exceeds a predetermined second threshold, it may be determined that the person frequently appears.

If the perimeter (outside the fence) of the premises of the facility 11, or a location (e.g., back of the warehouse) with less traffic of people, which is not a passage even in the premises, is set as the monitored range, the person who has been detected frequently in the monitored range is estimated to visit the location with an unusual purpose, and the person may be determined as a prowling person. If a location with a lot of traffic of people is set as the monitored range, a prowling person can be detected by creating a list (white list) of feature vectors of the persons who have been found as non-prowling persons and excluding the persons included in the list from the search results. The non-prowling persons are, e.g., residents in the collective housing, employees in the company, or students and teachers in school.

In conventional abnormal behavior detection, since the person is not specified, in principle, the person is not distinguished from the residents. Further, since a person is regarded simply as a moving object and determined from the movement thereof, it is necessary to accurately detect the movement (locus of the movement). Therefore, the capturing ranges (visual fields) of the monitoring cameras must be partially overlapped, which makes the installation of the monitoring cameras difficult. In addition, if the abnormal behaviors can be detected only by the observation for a long time since it is not possible to detect the abnormal behaviors for a short time while passing through the capturing range, it cannot be understood that the abnormal behaviors have been done by the same person. These problems are solved in the present embodiment.

Second Embodiment

A prowling person detection system in accordance with a second embodiment is configured to determine a prowling person by using time information and location information indicated by appearance history after automatically creating the white list or a record of the appearance history (behavioral pattern).

Figure 3:
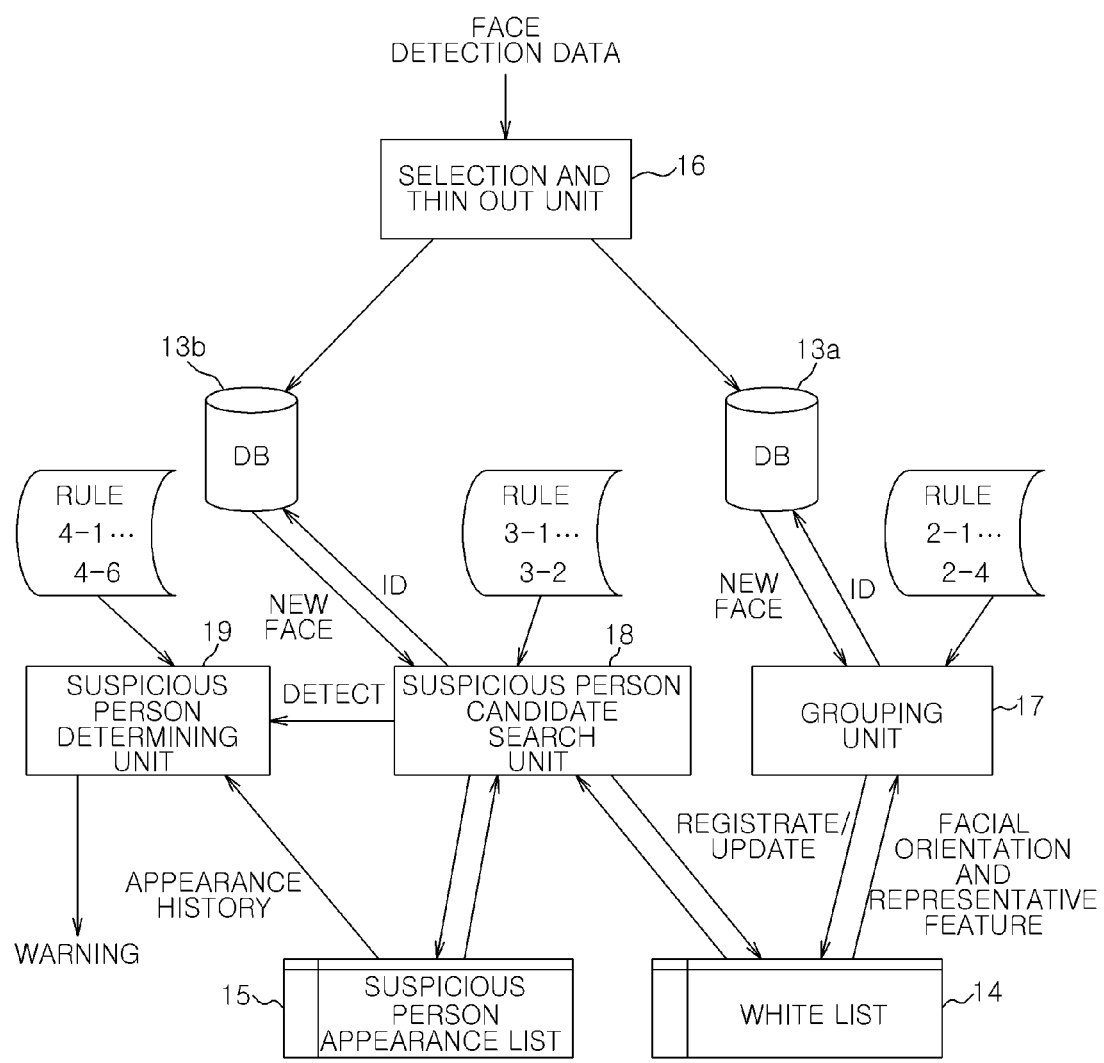
FIG. 3 is a processing block diagram of the prowling person detection system (second embodiment).

FIG. 3 shows a processing block diagram of the prowling person detection system of the present embodiment. The basic configuration and components of the system are the same as those of the first embodiment unless otherwise mentioned. In this embodiment, at least two monitoring cameras 12a and 12b are used. The monitoring camera 12a is provided in the environment (e.g., security area requiring authentication with ID cards, etc.) in which only the person (resident) who has been found to be not a suspicious person can be captured. The monitoring camera 12b is provided at a place (e.g., entrance) where it is intended to detect a suspicious person. Further, the DB 13 is divided internally into two DBs 13a and 13b according to two types of monitoring environments.

Each of the monitoring cameras 12a and 12b, when transmitting a facial image and a feature vector, also transmits a camera ID capable of specifying an individual camera, capturing time, facial orientation information, and the like. These are collectively referred to as face detection data. The DB 13 is configured to identify the camera ID such that the DB 13a registers only the face detection data of residents from the monitoring camera 12a, and the DB 13b registers the faces of residents and non-residents from the monitoring camera 12b. In the present embodiment, there is assumed an application example in which the number of residents is several thousands or less, and a general-purpose relational DB (in-memory database or column-oriented database is desirable) such as SQL is used as each of the DBs 13a and 13b. In the DBs 13a and 13b, as shown in Table 1, a single record (row) is obtained by adding an estimated person ID to the face detection data.

TABLE 1

| Capturing time | Camera ID | Estimated person ID | Facial image ID | Facial orientation information | Vector data |
| --- | --- | --- | --- | --- | --- |

Since the facial image ID that is an identifier for accessing the facial images stored in a separate server is usually a unique value, it also serves as a primary key in the DB 13. The facial image ID may be a combination of an ID which can specify the entire image (frame) from which the facial image is cut and taken and a face ID which is assigned to a face detected in the frame.

A white list 14 is a set of records using the estimated person ID as the primary key, and an example of elements included in one record is shown in Table 2.

TABLE 2

| Primary key | Number of grouping attempts | Last update date | Number of samples | Mean of all features | Variance of all features | Facial orientation | Mean of feature vectors | Variance of feature vectors | Facial orientation | ... |
|---|---|---|---|---|---|---|---|---|---|---|

The mean (centroid) or variance of all feature vectors is preferably that of all records to which the estimated person ID is assigned, and the number of samples is the total number of records used in those calculations. It also includes the mean or the like which has been calculated for each facial orientation. Three elements, i.e., facial orientation, and the mean and variance of feature vectors, are one set, and the mean or variance calculated for each facial orientation is retained if it can be calculated. The number of the sets is arbitrary. Unless otherwise mentioned, a feature to be searched initially is the mean of all features. Instead of the mean of feature vectors, a representative feature vector may be stored. Further, instead of the number of samples, all primary keys of the records of the DB 13 serving as samples may be enumerated. Alternatively, all primary keys may be enumerated for the DB 13a, and the number of samples may be used for the DB 13b.

A suspicious person appearance list 15 is a set of records using a suspicious person ID as the primary key, and the elements of the record are as shown in Table 3.

TABLE 3

| Primary key | Last update date | Number of samples | Mean of all features | Variance of all features |
|---|---|---|---|---|
| Facial image ID | Capturing time | Camera ID | Facial orientation | Facial image ID |

This record not only retains the mean (or a representative feature vector) and variance of feature vectors of the face to which the suspicious person ID is assigned, and the number of samples, similarly to the white list 14, but also appearance history obtained by enumerating a finite number of sets, each set (registration event) including facial orientation information, a camera ID, and capturing time when it was registered in the past. The appearance history may be the primary key of the corresponding record of the DB 13b. When the number of registration events reaches a specified value, the events are deleted in the order of oldest to newest.

The operation of the prowling person detection system of the present embodiment has the following four steps.

[Step 1] It is an initial step for increasing the number of faces registered in the DB 13 such that a meaningful search can be performed. In this step, the faces received from the monitoring cameras 12a and 12b are registered as they are. The estimated person ID is undetermined (null), and the number of grouping attempts is a default value (0). However, the estimated person ID can be assigned according to the following rule which uses the property that the same person frequently continues to appear in the moving image.

{Rule 1-1}: In the face detection data transmitted continuously from the monitoring camera 12a of the same camera ID, if there is no the face detection data having the same capturing time, or if the similarity of the feature with the face detection data transmitted immediately before the corresponding face detection data is equal to or greater than a predetermined threshold, these face detection data are assigned the same estimated person ID and registered in the DB 13a. Further, a newly issued estimated personal ID is registered in the white list 14. The estimated person ID that is assigned without confirmation based on the similarity of the feature in this rule, may be used to be distinguished from the ID assigned in other rules.

[Step 2] It is a step of creating the white list 14 by grouping the records of the same person. In this step, a grouping unit 17 performs a similar face search on the DBs 13a and 13b by using, as a search key, a facial image of a certain record which is registered in the DB 13a and in which the estimated person ID is undetermined. Then, the grouping unit 17 processes the search results according to the following rules, assigns a certain estimated person ID to the record used as the search key, and updates the white list 14.

{Rule 2-1}: In the search results from the DB 13a, those to which the estimated person ID has been already assigned are extracted from candidates for the same person, which have the similarity equal to or greater than the first threshold. Among them, if the most assigned estimated person ID (A) accounts for more than a predetermined first percentage, or if the estimated person ID (A) having the same camera ID and continuity in the capturing time are found, "A" is also assigned to the estimated person ID of the record of the search key and the records having undetermined estimated person IDs among the candidates for the same person.

{Rule 2-2}: In the search results from the DBs 13a and 13b, those which have the similarity equal to or greater than the second threshold and the facial orientation close to the facial orientation of the search key are used as the candidates for the same person. Among them, if there is a record to which the same estimated person ID (A) has been assigned more than a predetermined second percentage, "A" is also assigned to the estimated person ID of the record of the search key and the records having undetermined estimated person IDs among the candidates for the same person. The predetermined second percentage may be 0. That is, if there is even one candidate to which the estimated person ID is assigned among the candidates for the same person, it is assigned to the other candidates for the same person.

{Rule 2-3}: If there is no record that meets the condition of Rule 2-1 or 2-2 (if there is no candidate for the same person), a new estimated person ID is assigned to the record of search key in the DB 13a, and the record of the new estimated person ID is created in the white list 14.

{Rule 2-4}: When the estimated person ID is assigned according to Rule 2-1 or 2-2, if there is a record having another estimated person ID (B) among the candidates for the same person, whether or not it is necessary to merge is determined by comparing the feature vectors of the estimated person IDs (A and B) with reference to the updated white list 14. For example, in case that the mean or the like of the feature vectors for each facial orientation is obtained sufficiently, if comparison for each facial orientation results in sufficient similarity with each other, they are merged as the same person. Thus, although the distribution of features without considering the facial orientation overlaps with those of another person, it is possible to prevent erroneous merging. For the records of the DBs 13a and 13b to which the estimated person ID to disappear by the mergence has been assigned, the estimated person IDs are updated.

These rules may be interpreted as an implementation of well-known methods such as a k-neighborhood method, minimum mean variance method and Linde-Buzo-Gray (LBG) method only for the mergence, and may be substituted by another known clustering technique, but there is no need to forcibly perform the mergence of groups. Further, in the DBs 13a and 13b, capturing environments of the underlying facial images are different and the feature varies even for the same person. Thus, the evaluation criteria of clustering are provided in consideration of the facial orientation that is a major factor of variation. When calculating the similarity (distance in a feature space), a weight may be optimized (varied) according to the facial orientation.

[Step 3] It is a step of creating the suspicious person appearance list 15 by using the white list 14 so as to detect a suspicious person. In this step, whenever a new record is added to the DBs 13a and 13b, a suspicious person candidate search unit 18 searches for an estimated person with a similar feature vector from the white list 14 or the suspicious person appearance list 15, and registers or updates the estimated person that has been determined as a suspicious person candidate according to following Rules in the suspicious person appearance list 15.

{Rule 3-1}: The estimated person ID, which has the similarity of the feature vector with that of the newly added record in the DB 13b (and the DB 13a) equal to or greater than a third threshold, is retrieved from the suspicious person appearance list 15. In order to prevent the same person from being omitted, the third threshold is set such that multiple estimated person IDs (C) are extracted. Then, with respect to the multiple estimated person IDs (C), among the appearance histories retained in the records of the suspicious person appearance list 15, feature vectors of the appearance histories having the facial orientations close to the facial orientation of the newly added record are extracted from the DB 13b using the facial image ID as a key. If the feature vector having the similarity equal to or greater than a fourth threshold is found among the extracted feature vectors, since it is a suspicious person candidate which has been registered, the appearance history of the suspicious person appearance list is updated.

{Rule 3-2}: If there is nothing found by Rule 3-1, similar retrieval is performed on the white list 14. That is, the estimated person ID, which has the similarity of the feature vector with that of the newly added record in the DBs 13a and 13b equal to or greater than a third threshold is retrieved from the white list 14. In order to prevent the same person from being omitted, the third threshold is set such that multiple several estimated person IDs (D) are extracted. Then, with respect to the multiple estimated person IDs (D), by referring to the feature vectors of the facial orientations retained in the records of the white list 14, the estimated person ID in which the feature vector has the similarity equal to or greater than the fourth threshold and the facial orientation is close to the facial orientation of the newly added record is searched. If found, the estimated person ID is stored in the additional record, and the white list 14 is also updated if necessary. If not found, the record added to the DB 13a is newly registered in the white list 14 similarly to Rule 2-3, and the record added to the DB 13b is newly registered in the suspicious person appearance list 15.

Meanwhile, the fourth threshold used for the second search is intended to narrow the results of the first search, and usually equal to or greater than the third threshold (if the same feature space and distance scale are used) because comparison may be conducted in the same facial orientation in which the similarity is likely to be high. Further, when the feature vectors for every facial orientation are not comprehensively collected, the feature vector of the same facial orientation as the facial orientation of the newly added record is obtained by interpolating the feature vectors. Also, if Rule 3-2 is applied to the white list 14 with a small number of registrations, the residents may also be included in the suspicious person appearance list 15. Thus, if the number of registrations is small, registration into the suspicious person appearance list 15 may be deferred.

If the suspicious person candidate is detected by Rule 3-1 or 3-2 (registered or updated in the suspicious person appearance list), a suspicious person determining unit 19 checks whether or not the appearance history satisfies the following rules (whether proposition is true or false) to determine whether or not a person appearing at this time is a prowling person by these Boolean algebra operations or weighted scoring.

{Rule 4-1}: It does not match the order (preferably, the pattern including the time information) in which a person is captured by the monitoring cameras 12 when moving or entering the premises or buildings in a usual manner.

{Rule 4-2}: It is in a time zone that ordinary residents rarely appear.

{Rule 4-3}: It does not seem to go to any destination (i.e., on the prowl). For example, it is slow compared to a normal moving speed, or turns back on the way.

{Rule 4-4}: There is no specific event (opening and closing of the gate, ID authentication, etc.) which would occur before and after the appearance in the case of ordinary residents.

{Rule 4-5}: It is not applicable to a prospective visitor list that has been created in advance.

{Rule 4-6}: It is only one person (there is no other record (of estimated person ID) that has been captured simultaneously by the same monitoring camera)

Meanwhile, the moving speed in Rule 4-3 is determined to be slow when the moving time is noticeably longer than the standard moving time which has been obtained in advance with respect to a combination of adjacent camera IDs of the appearance history. Turning back is determined when two camera IDs of the appearance history within a predetermined time period are identical.

[Step 4] Periodically, old records are collectively deleted so that the capacity (number of records) of the suspicious person appearance list or the DBs 13a and 13b approaches a specified value. For the estimated person ID (B) of the records that have been deleted from the DBs 13a and 13b, the white list 14 is updated by the following rules. Also in the white list, if necessary, the records whose last update dates are old are deleted.

{Rule 5-1}: A similar face search is performed on the DBs 13a and 13b using, as a search key, the mean of the feature vectors retained in the records of the estimated person ID (B) in the white list 14. The search results are regrouped on the same basis as {Rule 3-1} or {Rule 3-2}.

{Rule 5-2}: Regardless of Rule 5-1, when the number of samples retained in the records of the estimated person ID (B) is 1, updating is not performed.

Further, (re)grouping may be performed by using well-known methods such as a cluster analysis technique (k-means method), deterministic annealing EM algorithm and the like in addition to the above-mentioned methods. The elements to be stored in the record of the white list 14 may be selected according to the need in the method to be used. For example, in many techniques such as EM, a measure for the extent of each cluster is required. When grouping the records of the same person is considered to be particularly important, a new component may be added to the feature vector by locally applying independent component analysis in the vicinity of the center of the group (mean of all features), or a locally available Mahalanobis distance including the neighboring groups may be used (referred to as metric learning). Alternatively, non-linear discrimination using kernel PCA may be introduced. In this case, one class SVM enabling unsupervised learning (including weakly-supervised learning) may be used.

Meanwhile, in step 4, the operation of step 3 is also continued. Further, in step 2 or 3, if the large number of records continue to be added to the DBs 13a and 13b for a short time, all of the records cannot processed completely so that the records to which the estimated person ID has not been assigned may be accumulated. Thus, by monitoring the frequency of additions or the number of records to which the estimated person ID has not been assigned, registrations in the DBs 13a and 13b should be thinned out so as not to exceed a predetermined upper limit. Further, the newly added record of the DB 13a does not necessarily have to be searched in Rule 3-1 of step 3. However, when a prowling person is detected, it may be temporarily searched to check whether or not there is a prowling person among those newly registered in the white list 14 within a predetermined time period.

As described above, according to the second embodiment, the white list 14 of residents and the like may be created automatically without manual operations, and it is possible to prevent the residents and the like from being determined as suspicious persons. Further, the distribution of the features obtained by continuously capturing the same person is maintained and utilized as much as possible, and a representative feature for each facial orientation is retained in the white list to determine the similarity for each facial orientation. Thus, even without complicated classification learning, accuracy enough to identify a person other than the residents can be expected. Further, the illumination environment or the resolution of an original facial image that is another factor that spreads the distribution of features may be maintained with distinguishing the features.

If the database itself has an internal function of grouping (grouping the data having the same value among the values in the same row), it is not necessary to consciously create the white list 14 or the suspicious person appearance list 15, and the DBs 13a and 13b may be referred to whenever required. However, it is efficient to separately retain at least parameters (mean (representative value) or variance of features and the like for each estimated person ID) for classification learning, metric learning and kernel learning.

In the present embodiment, since a very small number of suspicious persons are assumed and it is not considered important to accurately identify the suspicious persons, the mean of features and the like are not retained in the suspicious person appearance list 15. However, the records of the suspicious person appearance list 15 may have same structure as the white list. In the present embodiment, the white list is created earlier, but the suspicious person appearance list may be created earlier. For example, if there is no security compartment, or in the case of loose security in which tailgating may occur, on the basis of the behavioral pattern recorded in the suspicious person (non-resident) appearance list, the accuracy of whether or not the person is a resident may be obtained to automatically create the white list. If there is a periodicity of appearance in the behavioral pattern (e.g., appearance in the camera at a fixed time every day), it is strongly estimated that the person is a resident. Those which do not fall under the above-mentioned Rules 4-1 to 4-6 may also be used to estimate the resident. Further, a person appearing together with a person who has been already determined as a resident at high accuracy may also be determined as a resident at high accuracy. The person who has been determined as a resident is canceled from the suspicious person appearance list 15, and registered in the white list.

Third Embodiment

An staying person search device in accordance with a third embodiment of the present invention will be described with reference to FIGS. 4 and 5.

Figure 4:
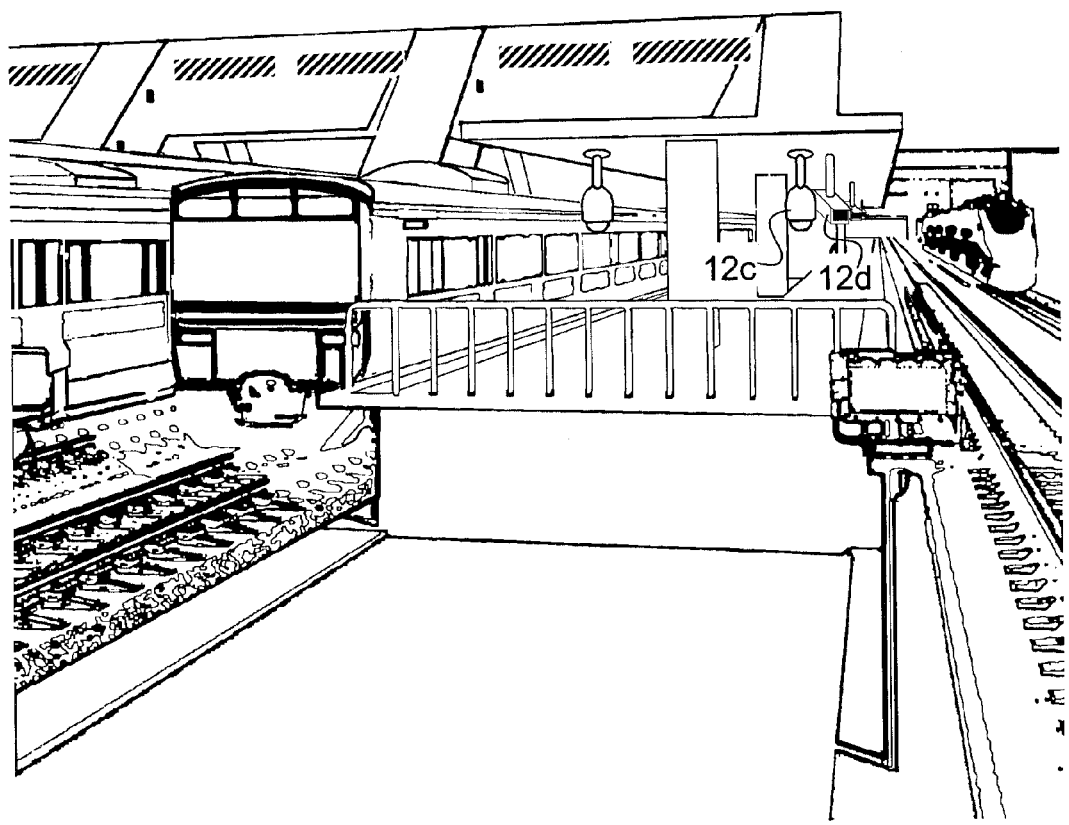
FIG. 4 is a diagram illustrating an installation state of a staying person search device (third embodiment).

FIG. 4 is a diagram illustrating an installation state of the staying person search device of the third embodiment. The device is intended to detect a person staying without getting on an arrived train on the platform of a railway station. If such a person stays on the platform where the train approaches fast, sometimes the person may cause an accident by entering a railway when the train approaches and is required to be protected in some cases.

At the roof of the platform, a dome-shaped camera 12c and/or a fixed camera 12d are installed, and the number of cameras is enough to capture the face of a person staying on the edge of the platform. The dome-shaped camera 12c is a small TV camera mounted on a gimbal such that the capturing direction and range thereof can be remotely adjusted, and is covered with a transparent hemispherical cover in a dark color. The dome-shaped camera 12c and/or the fixed camera 12d output a dynamic range compressed image signal so that the face of a person can be determined even when there are sunny and dark areas in the field of view. The dome-shaped camera 12c and/or the fixed camera 12d may capture not only the platform at which it is installed, but also a neighboring platform.

Figure 5:
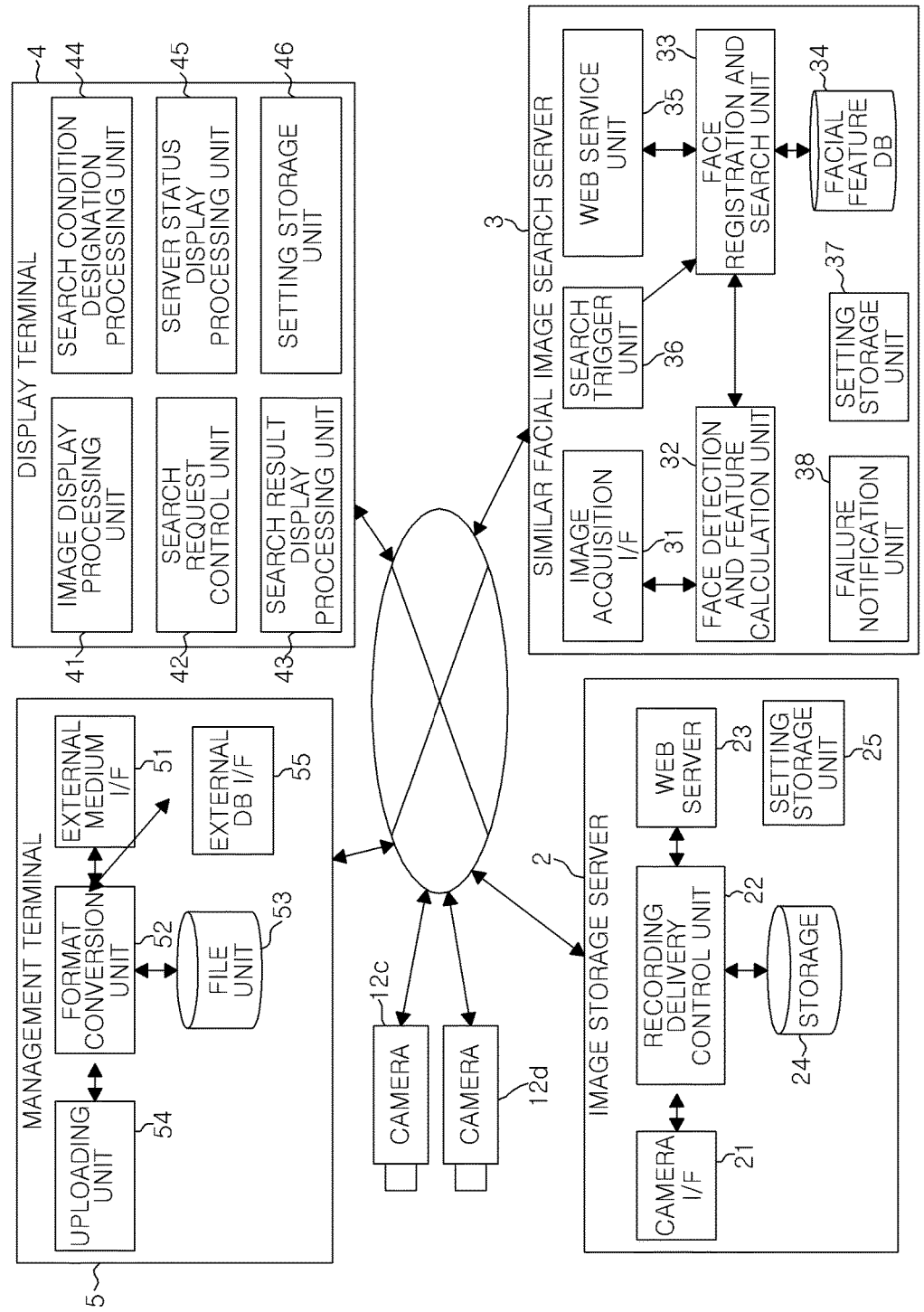
FIG. 5 is a block diagram of the staying person search device (third embodiment).

FIG. 5 is a block diagram of the staying person search device of the third embodiment. The device includes, in addition to the dome-shaped camera 12c and/or the fixed camera 12d, at least one of an image storage server 2, a similar facial image search server 3, a display terminal 4 and a management terminal 5. Further, the device includes a local area network (LAN) 6 for communicatively connecting them.

The image storage server 2 sends an image transmission request to the dome-shaped camera 12c via the LAN 6, and accumulates image data received from the dome-shaped camera 12c. Further, the image storage server 2 provides the accumulated images in response to a request from the similar facial image search server 3 and the like.

The image storage server 2 includes, as a functional configuration, a camera I/F 21, a recording delivery control unit 22, a Web server 23, a storage 24, and a setting storage unit 25.

The camera I/F 21 communicates with the dome-shaped camera 12c and the like via the LAN 6 in accordance with a unique protocol of the dome-shaped camera 12c or the like. The contents of communication are authentication confirming a right to acquire an image, an image transmission request containing a specification of image quality or the like, image data, and the like.

The recording delivery control unit 22 has a large capacity cache memory and manages the writing/reading of image data into/from the storage 24. During the recording, an image ID (image identification information) to be used as information when reading the image data as well as the image data may be recorded.

The recording delivery control unit 22 optimizes a unit of the image data to be written and the arrangement of the recording on the storage 24, and performs scheduling for writing and reading in order to respond to the request while reading and recording the streams of image data from multiple cameras in real time without omission. Further, in order to convert the storage 24 into RAID (Redundant Arrays of Inexpensive Disks), it controls the generation and writing of redundant data (parity). The streams of image data are split into write streams, and a horizontal parity and the like are generated from the write streams so as not to require a readout for generating the parity.

The Web server 23 receives an image request from the similar facial image search server 3 or the like with a HTTP protocol, and sends the image data read from the recording delivery control unit 22 in response to the image request. Also, the Web server 23 provides an operational state of the image storage server 2 as a Web page.

The storage 24 is a disk array constituted by Hard Disk Drives (HDDs) or Solid State Drives (SSDs). A special file system suitable for simultaneous multiple accesses to the image streams is used as the storage 24. For example, when all the correspondences between a recording position and an image ID that can uniquely specify a single image is converted into a table, it occupies larger than the capacity of the main memory. Accordingly, the storage 24 is configured so that the correspondences are efficiently referred to. The data to be recorded is subjected to encryption by an RAID controller or Advanced Encryption Standard AES-256 for each individual drive.

The setting storage unit 25 stores a schedule for acquiring images from the dome-shaped camera 12c and the like by the camera I/F, a schedule of redelivery to a display device and the like.

The similar facial image search server 3 includes, as a functional configuration, an image acquisition I/F 31, a face detection and feature calculation unit 32, a face registration and search unit 33, a facial feature DB 34, a Web service unit 35, a search trigger unit 36, a setting storage unit 37, and a failure notification unit 38.

The image acquisition I/F 31 is connected to the LAN 6, and acquires the images which are multicast transmitted from the dome-shaped camera 12c and the like, and the recorded image data of the image storage server 2 by making an image acquisition request or the like.

The face detection and feature calculation unit 32 divides the image acquired by the image acquisition I/F 31 into frames, and extracts an area which is estimated to be a face of a person from each of the frames. The estimation is basically performed depending on the color of the skin or whether or not it is possible to detect eyes, a nose and a mouth. For each face area that has been extracted, facial orientation is further estimated from the relative positions between the center of the face area and the eyes, the nose and the mouth. The face area is treated as a rectangular image having a predetermined aspect ratio, but a portion (background area) other than the face, such as four corners, is painted in a prescribed color.

Then, a normalization process relating to a size (vertical and horizontal numbers of pixels), resolution, brightness and contrast (histogram) is performed on each face area. With respect to the size, it is normalized to plural sizes.

Then, for each of plural sizes, the normalized face area is divided into blocks having a fixed size. The face detection and feature calculation unit 32 obtains color and brightness, a gradient and edge thereof, or a histogram of the pattern of the gradient and the edge, and outputs a multi-dimensional vector obtained by integrating the results as a facial feature. In this case, the face detection and feature calculation unit 32 outputs the capturing time, camera ID, image ID, other metadata and facial orientation information, which have been retained in the frame serving as a source for extraction, together.

The metadata may include a magnification in size normalization, accuracy of face estimation, spatial coordinates in the frame of the extracted faces, an extraction ID indicating extracting order number of the corresponding face among plural faces extracted in the same frame, an event type, etc. The accuracy of face estimation is a value close to zero, for example, when another object is superimposed on a part of the face. The event type is information indicating whether the image is acquired by normal recording (delivery) or alarm recording (delivery). Meanwhile, since the face feature has thousands of dimensions, redundant components highly correlated with the other components are removed. Further, in order to reduce the dimensions (amount of data), there is used a simple method of multiplying, from left to right, a matrix consisting of eigenvectors (basis vectors) which have been calculated in advance by well-known principal component analysis, linear (Fisher) discriminant analysis and independent component analysis by the feature vector. In the case of reducing the dimensions by using only principal component analysis, it is preferable to reduce the number of dimensions to about 1000 dimensions.

The face registration and search unit 33 performs other operations such as reading and searching in addition to writing (registering) the feature calculated by the face detection and feature calculation unit 32 into the facial feature DB 34. The feature is registered as a record containing attribute information such as capturing time, camera ID, facial image ID, facial orientation and magnification. At the time of registration, the face registration and search unit 33 classifies the feature into any of the categories, and registers the feature in a cluster (leaf cluster) corresponding to the category. The cluster has a hierarchical structure such as a multibranched decision tree, and only the number of branches may be identified during registration. Registration to the cluster is hierarchically performed by using a dictionary (also called a map, codebook or the like) or a hash function.

As a method of using the dictionary, vector quantization, self-organization mapping and the like are known. In the dictionary, a plurality of sets, each set including a representative vector (also referred to as a weight vector) and an address of a terminal cluster (leaf cluster) or the next dictionary to be referred to, are recorded. The feature to be registered is finally registered in the leaf cluster by repeatedly performing a process of full-searching the dictionaries from the uppermost one to find the closest representative vector. The dictionary indicating the address of the leaf cluster retains, in addition to the address, a person ID of the person registered in the leaf cluster. The leaf cluster stores data of records of very similar features. The dictionary is updated by an algorithm, called LBG or LVQ, which slightly modifies the representative vectors of the cluster and the neighboring cluster whenever the closest representative vector is found. Further, instead of using the dictionary, it is possible to use the feature vector encoded by a hash function (identifier) such as Locality Sensitive Hashing as the address of the cluster.

A method of using a covariance matrix or the like is based on a mixture distribution model, and performs classification, i.e., determine the next cluster to be referred to, which is one hierarchy lower, by selecting one having the maximum posterior probability (log likelihood, or a value obtained by changing the sign of the Mahalanobis distance to a negative sign) by matrix computation of the average vector or covariance matrix and the feature vector to be registered. An EM algorithm is known as an algorithm for optimizing parameters such as the covariance matrix and the like. Meanwhile, a k-d tree method that has been known for a long time is not suitable for searching for a high-dimensional vector as in the present embodiment. However, for example, if the components extracted and normalized in a small size of the feature vector are only registered, it is possible to use the upper level of the tree.

Each leaf cluster is desirable to have a size that contains one distribution for one person's facial image so as to correspond to a prototype. A correspondence between the person ID stored in the dictionary or the like of the leaf cluster and the leaf cluster being generated, divided and integrated by the clustering algorithm described above, is maintained. However, the leaf cluster does not necessarily one-to-one correspond to an actual individual person, and the leaf cluster ID and the person ID may be treated separately.

In order to speed up reference using the person ID as a key, a person ID table 71 which stores addresses of the leaf clusters corresponding to the person IDs may be provided. In the case of performing the reference using the facial image ID as a key, the facial image ID table is provided separately, or a column of a representative facial image ID is added to the person ID table 71. In any event, since all faces that can be detected from the image of the storage server 2 are not necessarily registered in the facial feature DB 34, the search using the facial image ID is not perfect. In other words, in the case of performing search using the face appearing in an arbitrary frame as a key, a feature is extracted (again) from the frame.

The feature search method is similar to the registration. The face registration and search unit 33 performs Nearest Neighbor Search (NNS) sequentially from the uppermost cluster using a given feature as a key, and performs linear (round robin) search for calculating the Manhattan distance between the key feature and the feature of each record in the leaf cluster to obtain desired similarity or a desired number of records. Meanwhile, when selecting the second-nearest cluster rather than the nearest neighbor in multiple classification hierarchies until it reaches the leaf cluster, it reaches the leaf cluster by the maximum number of hierarchies. By performing a linear search among these, it is possible to reduce the search leakage. If the size of the leaf cluster is set to be smaller than the distribution of the features of one person, the search in the leaf cluster is not required.

The facial feature DB 34 is a recording medium such as HDD retaining the data of the records included in the terminal clusters and the information of the multi-level clustering structure (tree). The facial feature DB 34 further retains the person ID table 71, a last search date/time list 72, and a black list 73 (to be described below), appropriately, in addition to parameters such as the dictionary, the hash function, and the covariance matrix and numerical values (e.g., intermediate values in calculation) to be used by an algorithm to optimize the parameters. It is preferable that all the facial feature DBs 34 are stored in an in-memory DB, but at least the tree information, parameters or numerical values and lists should be cached in the memory during operation. Further, the terminal clusters are disposed at recording positions (sector) that can be read consecutively. As a result, at least during the search, only one seek occurs for one search. The records of the facial feature DB 34 are basically can be newly registered and deleted, but cannot be changed. The facial feature DB 34 is internally configured as a plurality of division DBs (different from the clustering described above). When the capacity of the division DB reaches the upper limit, the division DB is operated by a rotation manner such that the oldest division DB is initialized and is used as a new registration destination. A temporal sequence of the division DB is called a generation. The facial feature DB 34 may be configured to be further divided depending on the magnification, facial orientation or the like. In the case of updating a basis function used to reduce the dimensions of the feature in order to optimize the identification in the above clustering, the update may be performed when the generation changes. As a result, feature spaces may be different between generations. If it is a purpose to search for an staying person, an interval between generations may be similar to the stay time.

The Web service unit 35 receives a search request or an image request from the display terminal 4, or the setting information of the similar facial image search server 3 and the like from the management terminal 5. In response thereto, the Web service unit 35 provides the processing results as data such as Web pages, thereby implementing a search application. The search request includes a staying person detection request (short-term search request), a key-designated search request, a black list 73 comparison request, an event search request, and a combination thereof. Upon receiving the search request, the Web service unit 35 transmits the information (e.g., facial image ID corresponding to the feature used as a key) of search conditions contained in the search request to the face registration and search unit 33. Then, based on the search results received from the face registration and search unit 33, the Web service unit 35 generates data of the Web page (display screen) as a response to the display terminal 4. The search results are provided, for example, as tiled display in which facial images are arranged in a grid shape. The Web service unit 35 describes an address (URI) based on the facial image ID in the image storage server 2 on the Web page, so that the display terminal 4 acquires each facial image. Further, the Web service unit 35 also describes the facial image ID itself, the person ID or the like, so that the display terminal 4 can request a new search which uses the face included in the search results as a key.

The search trigger unit 36 controls the face registration and search unit 33 to perform automatically staying person detection at appropriate time intervals. The search trigger unit 36 receives the train operation data and the like and compares them with the current date/time to transmit appropriate search conditions to the face registration and search unit 33.

Here, it is assumed a case of searching for a face in image which has been captured continuously for time period T from the current time to a time a few minutes earlier than the stop time of the second previous train which was stopped at that station. When newly registering the face, the face registration and search unit 33 obtains the person ID corresponding to the leaf cluster to be registered. Then, the face registration and search unit 33 obtains the last search date/time of the person by referring to the last search date/time list 72 using the person ID as a key. If a difference between the last search date/time and the current time exceeds time period $\alpha \times T$ ($\alpha$ is a coefficient less than 1), a similar face search is performed while being limited to the records registered for the time period T in the past, and the number of extraction is returned from the face registration and search unit 33. This time limitation may be realized by checking the capturing time before the calculation of the similarity and excluding those which do not meet time condition, for example, during the round-robin search. When the search is performed, the last search date/time list 72 is updated. The last search date/time list 72 is a table for retaining the last search date/time using the person ID as a primary key.

The Web service unit 35 or the search trigger unit 36 may easily determine whether or not the person is a staying person by comparing the number of extraction received with the number of registration expected for the staying person (value obtained by diving the time period T by a registration time interval (depending on the frequency of acquiring the image from the image storage server 2)), and appropriately may notify determination results in the display terminal or register the determination results into the black list 73. Even though the number of extraction is small, if the person is registered in the black list 73, the person is notified. The black list 73 retains registration history including date/time that the person has been determined as an staying person, the facial image ID at that time and the like, using the person ID as a primary key, for about a few months.

The setting storage unit 37 stores various settings required for the similar facial image search server 3 or the information of the user that can be logged, and the like. The failure notification unit 38 notifies a failure that occurs in the similar facial image search server 3 to the management terminal 5 with an SMTP trap or the like.

The display terminal 4 is a personal computer (PC) having a function of a Web browser, sends a search request or an image request to the similar facial image search server 3 or the image storage server 2, and displays Web pages or the like received as a response thereto. The functions of a search request control unit 42, a search result display processing unit 43, a search condition designation processing unit 44, and a server status display processing unit 45 are realized by components such as javascript (trademark), Active X (trademark) and Net Frameworks (trademark) contained in the Web browser or Web page, and an image display processing unit 41 is realized by Directshow (trademark) or the like. The display terminal 4 may have the same function as a display terminal of a general monitoring camera system. That is, by specifying any of the cameras, live images or recorded images from the image storage server 2 can be obtained and displayed with a protocol such as Media Resource Control protocol (MRCP).

The management terminal 5 is a general personal computer (PC) for inputting images of an external medium into the staying person search device of the present embodiment, or performing a backup of the recorded image. An external medium I/F 51 is an interface connectable to any external medium such as a DVD drive or USB (trademark). A format conversion unit 52 converts the DB or image captured from the external medium I/F 51 and the like in conformity with the format of the staying person search device.

A file unit 53 is a storage device that stores the image after format conversion or received from the external medium I/F 51 and the like. An uploading unit 54 transmits the files with a FTP protocol or the like via the LAN 6 between the similar facial image search server 3 or the image storage server 2 and the file unit 53. For example, the file unit 53 uploads black list raw data acquired from the outside to the similar facial image search server 3 to be merged with the black list 73 of the similar facial image search server 3 or downloads a snapshot of the facial feature DB 34 into the file unit 53.

An external DB I/F 55 may input and output data by accessing any server on the network with an Open DataBase Connectivity (ODBC), JET database engine or the like. For example, it is used when linking the black lists of similar staying person search devices installed in routes of different railway companies with each other.

The LAN 6 is a private network established by, e.g., Ethernet (trademark) to connect the devices from the image storage server 2 to the management terminal 5 that may be installed in various locations. The LAN 6 is not limited to the network of a single collision domain.

In the embodiments described above, a learning machine may be used in the identification of the person (similarity, clustering), but is not involved directly in determining whether or not the person is a suspicious person. That is, the suspicious person is extracted by rules which are easy to understand based on the appearance history, and whether or not the person is a suspicious person is ultimately determined by a guard. The rules are intuitively adapted for each use by adjusting parameters such as the extraction time period to be widely available. Of course, the present invention is not intended to preclude the determination of the guard from serving as a teacher of the learning machine.

The configuration of the system or device of the present invention is not necessarily limited to those described above, and various configurations may be employed. Further, the present invention may also be provided as, for example, a method or apparatus for the execution of the processes according to the present invention, a program for realizing such a method in a computer, or a non-transient tangible medium for recording the program. For example, the present invention may be provided as a combination of a program installed in a smart phone to allow the smart phone to function as the monitoring cameras 12 and a program installed in a personal computer to allow the personal computer to function as a home security system, or as the latter alone.

INDUSTRIAL APPLICABILITY

It is available for a Closed-Circuit Television (CCTV) system, a security alarm system or the like.

What is claimed is:
1. A person search method comprising:
a first step of receiving face detection data including a feature extracted from a facial image detected from images of a plurality of cameras, an attribute of each camera and time information, and registering records including the face detection data in a first database or a second database depending on the attributes of the cameras;
a second step of grouping records of a same person by searching for similar features in at least one of the first database and the second database using, as a search key, a feature of any record which is registered in the first database and has undetermined estimated person ID, assigning an estimated person ID to the record used as the search key based on a predetermined first rule, and updating a white list retaining the assigned estimated person ID in association with the feature thereof;
a third step of detecting a suspicious person candidate by creating a suspicious person appearance list based on a predetermined second rule, and searching for similar features in the suspicious person appearance list using, as a search key, a feature of a record newly registered in at least the second database; and
a fourth step of adding an appearance history to the record having the feature used as the search key in the third step when the suspicious person candidate is detected, and determining whether or not the suspicious person candidate corresponds to a suspicious person based on a predetermined third rule from the appearance history retained in the suspicious person appearance list.

2. The person search method of claim 1, wherein the face detection data further includes orientation information of the detected facial image, and the records of the white list retain, as the features, representative features corresponding to the information for respective facial orientations and a total representative feature corresponding to all the facial orientations.

3. The person search method of claim 1, wherein the predetermined second rule is characterized in that if there is no result with similarity greater than a predetermined value by searching for similar features in the white list using, as the search key, the feature of the record newly registered in the second database, the record having the feature used as the search key is newly registered in the suspicious person appearance list.

4. The person search method of claim 2, wherein the predetermined first rule includes at least one of:
   a first sub-rule of extracting, from results of the search for the first database in the second step, first candidates for the same person which have similarity with the total representative feature being equal to or greater than a first threshold and to which the estimated person IDs have been assigned, and if records of the most frequent estimated person ID account for more than a predetermined first percentage in the first candidates, or if records of the estimated person ID having a same camera ID and continuity in capturing time are found in the first candidates, assigning the same ID as the estimated person ID to the record having the feature used as the search key and a record whose estimated person ID is undetermined among the first candidates for the same person, and
   a second sub-rule of extracting, from results of the search for at least one of the first database and the second database in the second step, second candidates for the same person which have similarity with the representative feature having facial orientation closest to facial orientation of the feature used as the search key being equal to or greater than a second threshold, and if records to which the same estimated person ID has been assigned account for more than a predetermined second percentage in the second candidates, assigning the same ID as the estimated person ID to the record having the feature used as the search key and a record whose estimated person ID is undetermined among the second candidates for the same person.

5. The person search method of claim 1, wherein the predetermined third rule is to check whether or not at least one of the following conditions is satisfied,
   (i) when a person enters premises or a building, or is moving therein in a legitimate manner, it does not match the order in which the person should be captured by the plurality of cameras,
   (ii) it is in a time zone that an owner, a resident or a relevant person of the premises or building rarely appear,
   (iii) the person is slow compared to a normal moving speed, or turns back on the way,
   (iv) no specific event that would occur before and after appearance of the owner, the resident or the relevant person, is detected, and
   (v) the person appears at a time different from a scheduled time of a visitor notified previously, and there are no other records that the person is captured by the same monitoring camera at that time.

6. A device for searching a person staying on a platform, comprising:
   means for creating a database by detecting facial images in input images from cameras for capturing a station platform, extracting features from the facial images, and registering the features in the database together with time information;
   means for searching for, in the database created in the creating step, similar features among the features registered in a predetermined time period longer than a time period between arrival and departure of a train;
   means for determining whether or not a person is staying on the platform by comparison between the number of the features of the person detected by said means for searching and the number of registrations which allows a person to be expected as a staying person;
   means for registering the person who is determined as the staying person in a black list; and
   means for, when a feature similar to the features of the registered person is retrieved from the database, notifying that.

* * * * *